(12) United States Patent
Farnsworth et al.

(10) Patent No.: US 11,548,408 B2
(45) Date of Patent: Jan. 10, 2023

(54) CONTROL SYSTEMS AND METHODS TO MEET FUEL CELL FUEL DEMAND

(71) Applicants: Toyota Motor Engineering & Manufacturing North America, Inc., Plano, TX (US); Toyota Jidosha Kabushiki Kaisha, Aichi-ken (JP)

(72) Inventors: Jared M. Farnsworth, San Francisco, CA (US); Daniel C. Folick, Long Beach, CA (US); Shigeki Hasegawa, Aichi (JP); Nobukazu Mizuno, Aichi (JP)

(73) Assignees: TOYOTA JIDOSHA KABUSHIKI KAISHA, Aichi-Ken (JP); TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 156 days.

(21) Appl. No.: 17/191,658

(22) Filed: Mar. 3, 2021

(65) Prior Publication Data

US 2022/0285707 A1 Sep. 8, 2022

(51) Int. Cl.
| | |
|---|---|
| *B60L 58/30* | (2019.01) |
| *H01M 8/04746* | (2016.01) |
| *H01M 8/04119* | (2016.01) |
| *H01M 8/04858* | (2016.01) |
| *H01M 8/04223* | (2016.01) |

(52) U.S. Cl.
CPC ........... *B60L 58/30* (2019.02); *H01M 8/0491* (2013.01); *H01M 8/04164* (2013.01); *H01M 8/04179* (2013.01); *H01M 8/04753* (2013.01); *H01M 8/04231* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 10,714,769 B2 * | 7/2020 | Hasegawa | H01M 8/04223 |
| 11,069,909 B2 * | 7/2021 | Watanabe | H01M 8/04231 |
| 2005/0147863 A1 * | 7/2005 | Hiramatsu | H01M 8/04395 429/432 |
| 2009/0280373 A1 * | 11/2009 | Baaser | H01M 8/04164 702/147 |
| 2020/0153012 A1 * | 5/2020 | Kim | H01M 8/04992 |

* cited by examiner

*Primary Examiner* — Jared Fureman
*Assistant Examiner* — Joel Barnett
(74) *Attorney, Agent, or Firm* — Snell & Wilmer LLP

(57) ABSTRACT

Systems and methods for controlling fluid flow in a fuel cell circuit of a vehicle. A system may have a fuel cell stack configured to receive hydrogen gas. The system may have a current sensor configured to detect current flowing through the fuel cell stack. The system may have a plurality of actuators, which may include at least one injector, a pump, and a shut valve. The system may have an electronic control unit (ECU). The ECU may estimate pressures of the hydrogen gas and non-hydrogen gases in the circuit. The ECU may determine a current increase rate based on the detected current. The ECU may apply a compensatory hydrogen gas stoic to a base hydrogen gas stoic to meet a target hydrogen gas stoic by controlling one or more of the actuators based on the estimated pressures when the current increase rate is above a predetermined threshold value.

20 Claims, 5 Drawing Sheets

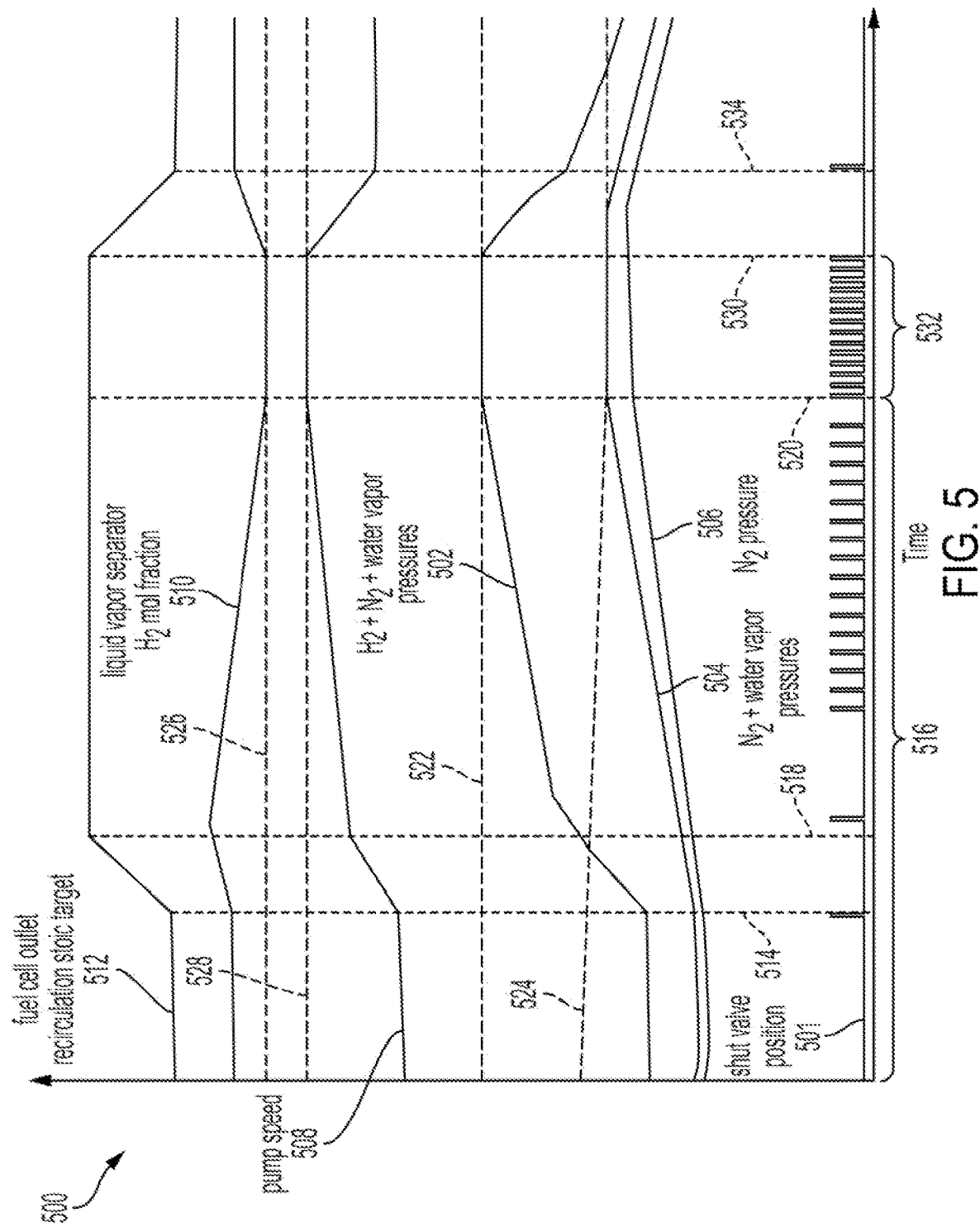

CONTROL SYSTEMS AND METHODS TO MEET FUEL CELL FUEL DEMAND

BACKGROUND

1. Field

The present disclosure relates to systems and methods for controlling fluid flow through a fuel cell stack of a fuel cell circuit based on a real-time model of the circuit and, more particularly, to systems and methods for preventing fuel, or hydrogen, deficiency under transient and over-pressure conditions observed by the fuel cell circuit.

2. Description of the Related Art

As the push for conservation of natural resources and reduced pollution advances, various concepts have been discovered to achieve such goals. These concepts range from harvesting wind and sun-based energy to various improvements in vehicle design. The vehicle improvements include new engines designed to improve fuel economy, hybrid vehicles that operate using a combination of an engine and a motor-generator to further improve fuel economy, fully electric vehicles that operate based on power stored in a battery, and fuel cell vehicles that generate electricity by facilitating a chemical reaction.

Many fuel cell vehicles include a fuel cell stack that includes multiple fuel cells. The fuel cells may receive a fuel, which typically includes hydrogen, along with oxygen (via air) or another oxidizing agent. The fuel cell stack may facilitate a chemical reaction between the hydrogen and oxygen. This chemical reaction generates electricity and water as a byproduct. The electricity generated by the fuel cell stack may be stored in a battery or directly provided to a motor-generator to generate mechanical power to propel the vehicle. While fuel cell vehicles are an exciting advancement in the automobile industry, the technology is relatively new, providing space for improvements to the technology.

Electrical output of the fuel cell stack varies based on a pressure and flow of the gases (e.g., hydrogen and air) located therein. The desired electrical output may be determined based on a power request which may be based on starting or accelerating the vehicle. In that regard, it is desirable to accurately control the pressure and flow of hydrogen into the fuel cell stack from both a hydrogen supply and a hydrogen recirculation route to achieve the desired electrical output in a timely manner. However, it is important to know the pressure and flow of the various elements within the circuit (e.g., pipes, valves, pumps, etc.) in order to accurately and quickly control the fuel cell stack.

Thus, there is a need in the art for systems and methods for accurately controlling hydrogen circulation to a fuel cell stack of a vehicle.

SUMMARY

Systems and methods for controlling fluid flow in a fuel cell circuit of a vehicle to meet a fuel demand of a fuel cell stack of the fuel cell circuit in both steady and transient conditions. The system may have a current sensor configured to detect current flowing through the fuel cell stack. The system may have a plurality of actuators. The system may have an electronic control unit (ECU). The ECU may estimate pressures of the fuel and non-fuel gases in the circuit. The ECU may determine a current increase rate based on the detected current. The ECU may apply a compensatory fuel amount to a base fuel gas amount to meet a target fuel amount by controlling one or more of the actuators based on the estimated pressures when the current increase rate is above a predetermined threshold value.

In accordance with an embodiment of the present disclosure, there may be a system for controlling flow of fluids in a fuel cell circuit of a vehicle. The system may have a fuel cell stack having a plurality of fuel cells. The fuel cell stack may be configured to receive hydrogen gas. The system may further have a current sensor. The current sensor may be configured to detect a current flowing through the fuel cell stack. The system may have a plurality of actuators. The actuators may include at least one injector configured to supply the hydrogen gas to the fuel cell stack and adjust a pressure of the hydrogen gas. The actuators may further include a pump and/or a blower configured to facilitate the flow of the fluids in the fuel cell circuit. The fluids may comprise the hydrogen gas and non-hydrogen gases. The actuators may further include a shut valve configured to purge the fluids from the fuel cell circuit to adjust pressures of the non-hydrogen gases. The system may further have an ECU coupled to the fuel cell stack, the current sensor, and the actuators. The ECU may be configured to estimate the pressure of the hydrogen gas and the pressures of the non-hydrogen gases in real-time. The pressures of the hydrogen gas and the non-hydrogen gases may define a total system pressure. The ECU may be further configured to determine a current increase rate based on the detected current. The ECU may be further configured to apply a compensatory hydrogen gas stoic to a base hydrogen gas stoic to meet a target hydrogen gas stoic by controlling one or more of the actuators based on the estimated pressures of the hydrogen gas and the non-hydrogen gases when the fuel cell current rate is above a predetermined threshold value.

The ECU may increase the pressure of the hydrogen gas by controlling the at least one injector to meet the target hydrogen gas stoic when the pump operates below an optimal speed under transient conditions. The ECU may decrease the pressure of the hydrogen gas once the pump operates at the optimal speed. The ECU may control the shut valve to regulate the total system pressure to ensure that the total system pressure does not exceed a maximum total system pressure. The ECU may increase a speed of the pump to meet the target hydrogen gas stoic. The compensatory hydrogen gas stoic may be 0.25, the base hydrogen gas stoic may be 1.00, and the target hydrogen gas stoic may be 1.25. The ECU may open one, some, or all of the at least one injector to control the pressure of the hydrogen gas.

The non-hydrogen gases may include water vapor. The system may further have a liquid vapor separator configured to direct the water vapor from the fuel cell stack to the pump and direct liquid water separated from the water vapor to be expelled through the shut valve to meet the target hydrogen gas stoic. The ECU may estimate a mole fraction of the hydrogen gas at an outlet of the liquid vapor separator to determine a speed of the pump.

In accordance with another embodiment of the present disclosure, there may be a method for meeting hydrogen gas demand in a fuel cell circuit of a vehicle under transient conditions. The method may include detecting, by a current sensor, a current flowing through a fuel cell stack. The method may further include estimating, by an ECU, a pressure of the hydrogen gas and pressures of non-hydrogen gases at an outlet of the fuel cell stack. The method may further include determining, by the ECU, a current increase rate based on the detected current. The method may further include determining, by the ECU, a target hydrogen gas stoic at an inlet of the fuel cell stack based on the detected current. The method may further include increasing, by at least one injector, the pressure of the hydrogen gas at the outlet based on the estimated pressures of the hydrogen gas and the non-hydrogen gases to meet the target hydrogen gas stoic when the current increase rate is above a predetermined threshold. The method may further include decreasing, by the ECU, the pressure of the hydrogen gas once a pump configured to recirculate the hydrogen gas into the fuel cell operates at a speed to meet the target hydrogen gas stoic when the current increase rate is above the predetermined threshold.

The method may further include purging, by a shut valve, a predetermined amount of the hydrogen gas and predetermined amounts of the non-hydrogen gases from the fuel cell circuit to keep a total system pressure at or below a maximum total system pressure. The total system pressure may be defined by the pressures of the hydrogen gas and the non-hydrogen gases. The non-hydrogen gases may comprise water. The method may further include separating, by a liquid vapor separator, liquid water from the water vapor. The method may further include exhausting, by the shut valve, the liquid water prior to the purging of the predetermined amount of the hydrogen gas and the predetermined amounts of the non-hydrogen gases.

The ECU may estimate the pressure of the hydrogen gas based on data from one or more pressure sensors configured to detect pressure at least at an outlet of the at least one injector. The ECU may open one, some, or all of the at least one injector to control the pressure of the hydrogen gas.

In accordance with another embodiment of the present disclosure, there may be a method for meeting hydrogen gas demand in a fuel cell circuit of a vehicle. The method may include determining, by an ECU, a target hydrogen gas recirculation stoic at an inlet of a fuel cell stack. The method may further include estimating, by the ECU, a mole fraction of the hydrogen gas at an outlet of a liquid vapor separator, a pressure of the hydrogen gas, and pressures of non-hydrogen gases at an outlet of the fuel cell stack. The pressures of the hydrogen gas and the non-hydrogen gases may define a total system pressure. The method may further include increasing, by the ECU, a speed of a hydrogen pump based on the mole fraction of the hydrogen gas to meet the target hydrogen gas recirculation stoic while minimizing excess hydrogen gas purging to improve overall efficiency of the fuel cell circuit. The method may further include purging, by a shut valve, a predetermined amount of the hydrogen gas, predetermined amounts of non-hydrogen gas, and a predetermined amount of liquid water directed from the liquid vapor separator to prevent the total system pressure from exceeding a maximum total system pressure. The predetermined amount of the hydrogen gas and the predetermined amount of non-hydrogen gas are purged to maintain the pressure of the hydrogen gas at the outlet of the fuel cell stack at a target pressure and the mole fraction of the hydrogen gas at the outlet of the liquid vapor separator at a minimum mole fraction. The ECU may determine the target hydrogen gas recirculation stoic based on a current flowing through the fuel cell stack. The method may further include determining, by the ECU, a target volumetric flow of the hydrogen gas to determine the speed of the hydrogen pump.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

FIG. 5 is a graph illustrating an exemplary operation of the fuel cell circuit of FIG. 1 in an over-pressure condition according to an embodiment of the present disclosure.

DETAILED DESCRIPTION

The present disclosure describes systems and methods for controlling fluid flow, such as hydrogen gas and non-hydrogen gas (e.g., nitrogen, water vapor), within a fuel cell circuit to meet a fuel (e.g., hydrogen gas) demand of the fuel cell under various conditions, including steady and transient conditions. The systems provide various advantages and benefits such as controlling various actuators of the circuit based on a real-time model of the circuit. This advantageously provides for accurate state determination of each element of the circuit using relatively few sensors, which beneficially reduces a cost of the system. The systems further advantageously utilize high level state target values to generate coarser actuator values to then control each actuator with specificity to meet the state target values.

An exemplary system may have a fuel cell stack configured to receive hydrogen gas. The system may have a current sensor configured to detect current flowing through the fuel cell stack. The system may have a plurality of actuators, which may include at least one injector, a pump, and/or a shut valve. The at least one injector may be configured to supply the hydrogen gas to the fuel cell stack and adjust a pressure of the hydrogen gas. The at least one pump may be configured to facilitate the flow of the fluids in the fuel cell circuit. The fluids may include the hydrogen gas and non-hydrogen gases. The shut valve may be configured to purge the fluids from the fuel cell circuit to adjust pressures of the non-hydrogen gases. The system may have an electronic control unit (ECU) coupled to the fuel cell stack, the current sensor, and the actuators. The ECU may estimate the pressures of the hydrogen gas and non-hydrogen gases in the circuit in real-time. The ECU may determine a current increase rate based on the detected current. The ECU may apply a compensatory hydrogen gas stoic to a base hydrogen gas stoic to meet a target hydrogen gas stoic by controlling one or more of the actuators based on the estimated pressures when the current increase rate is above a predetermined threshold value.

Figure 1:
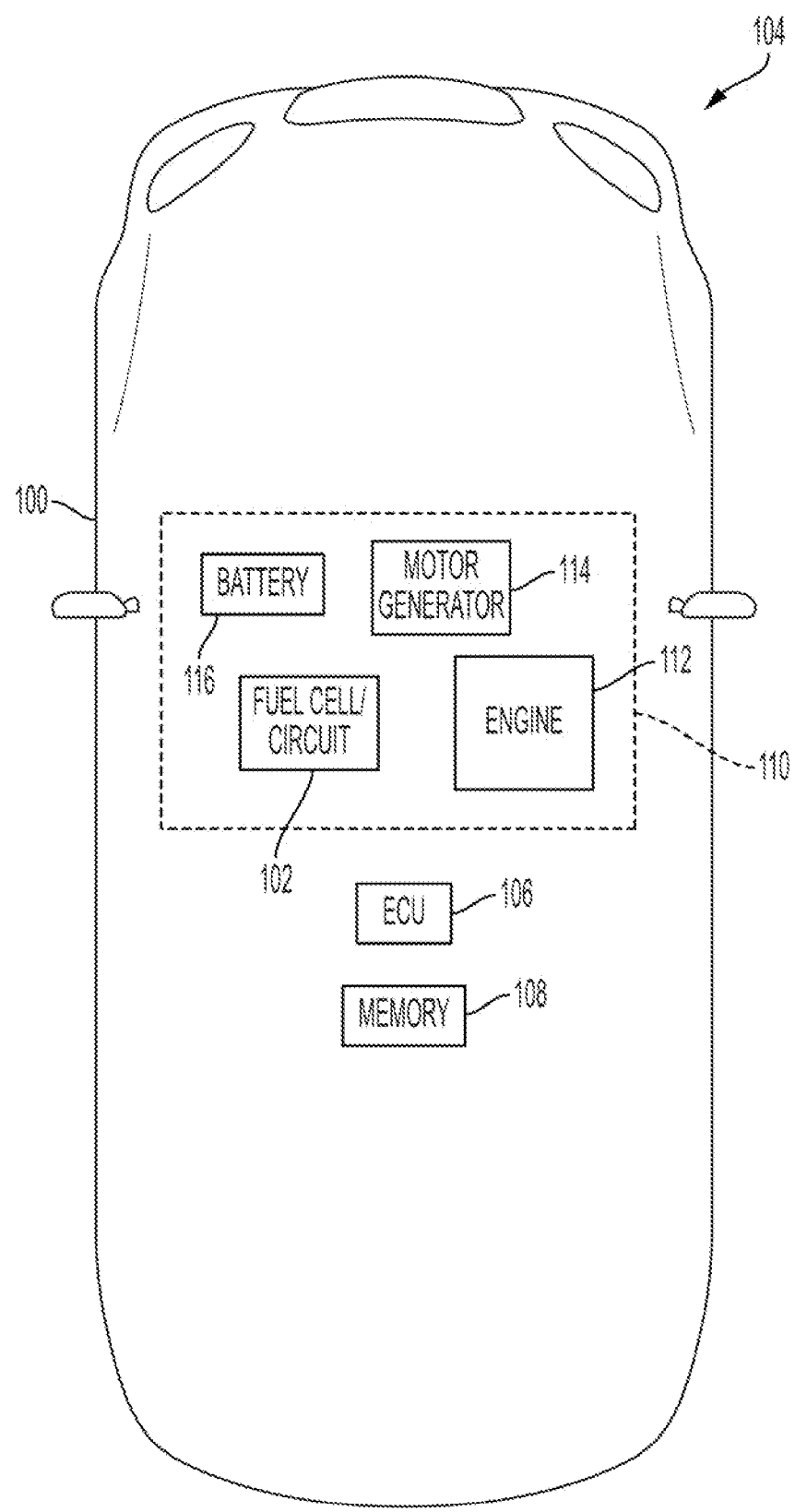
FIG. 1 is a block diagram illustrating various components of a vehicle having a fuel cell circuit capable of generating electricity based on a chemical reaction according to an embodiment of the present disclosure.

FIG. 1 is a block diagram illustrating various components of a vehicle 100 having a fuel cell circuit 102 capable of generating electricity based on a chemical reaction according to an embodiment of the present disclosure. The vehicle 100 includes components of a system 104 for controlling a flow of one or more fluids (i.e., gas and/or liquid) into and out of fuel cells. The gas may be hydrogen gas or a non-hydrogen gas, such as nitrogen, water and/or water vapor and/or a combination thereof that permeates into the fuel cells. The liquid may be water. The system 104 may control the flow of the fluids to maintain a target hydrogen stoic, or a ratio of hydrogen gas to mole of hydrogen consumed by the fuel cells to operate the fuel cell more efficiently.

The vehicle 100 and the system 104 may include an ECU 106 and a memory 108. The vehicle 100 further includes a power source 110 which may include at least one of an engine 112, a motor-generator 114, a battery 116, and/or the fuel cell circuit 102. The fuel cell circuit 102 may be a part of the system 104.

The ECU 106 may be coupled to each of the components of the vehicle 100 and may include one or more processors or controllers, which may be specifically designed for automotive systems. The functions of the ECU 106 may be implemented in a single ECU or in multiple ECUs. The ECU 106 may receive data from components of the vehicle 100, may make determinations based on the received data, and may control the operation of components based on the determinations.

In some embodiments, the vehicle 100 may be fully autonomous or semi-autonomous. In that regard, the ECU 106 may control various aspects of the vehicle 100, such as steering, braking, accelerating, or the like, to maneuver the vehicle 100 from a starting location to a destination location.

The memory 108 may include any non-transitory memory known in the art. In that regard, the memory 108 may store machine-readable instructions usable by the ECU 106 and may store other data as requested by the ECU 106 or programmed by a vehicle manufacturer or operator. The memory 104 may store a model of the fuel cell circuit 102. The model may include equations or other information usable to estimate various parameters of the fuel cell circuit 102. That is, the model of the fuel cell circuit may determine a current or present state of each component (e.g., actuators, pipes, or the like) of the fuel cell circuit 102. The state of each component may include a stoic (e.g., hydrogen stoic), a pressure value (e.g., both at an inlet and at an outlet of the component), and a flow value (e.g., a volumetric flow rate) through the component. The model may be a real-time model or a near-real-time model which continuously or periodically (e.g., at least every second, at least every half second, at least every tenth of a second, every one hundredth of a second, or the like) determines new states for each component. In some embodiments, the system 100 may determine the various parameters via one or more sensors instead of or in addition to estimating the parameters via the ECU 106.

The engine 112 may convert a fuel into mechanical power. In that regard, the engine 112 may be a gasoline engine, a diesel engine, or the like. The battery 116 may store electrical energy. In some embodiments, the battery 116 may include any one or more energy storage device including a battery, a flywheel, a super-capacitor, a thermal storage device, or the like.

The fuel cell circuit 102 may include a plurality of fuel cells that facilitate a chemical reaction to generate electrical energy. For example, the fuel cells may receive hydrogen and oxygen, may facilitate a reaction between the hydrogen and oxygen, and may output electricity in response to the reaction. In that regard, the electrical energy generated by the fuel cell circuit 102 may be stored in the battery 116 or directly utilized by the motor-generator 114 or another component of the vehicle 100 (e.g., a heating-ventilation-air conditioning (HVAC) unit). In some embodiments, the vehicle 100 may include multiple fuel cell circuits including the fuel cell circuit 102.

The motor-generator 114 may convert the electrical energy stored in the battery 116, or electrical energy received directly from the fuel cell circuit 102, into mechanical power usable to propel the vehicle 100. The motor-generator 114 may further convert mechanical power received from the engine 112 or wheels of the vehicle 100 into electricity, which may be stored in the battery 116 as energy and/or used by other components of the vehicle 100 (e.g., an HVAC system). In some embodiments, the motor-generator 114 may also or instead include a turbine or other device capable of generating thrust.

Figure 2:
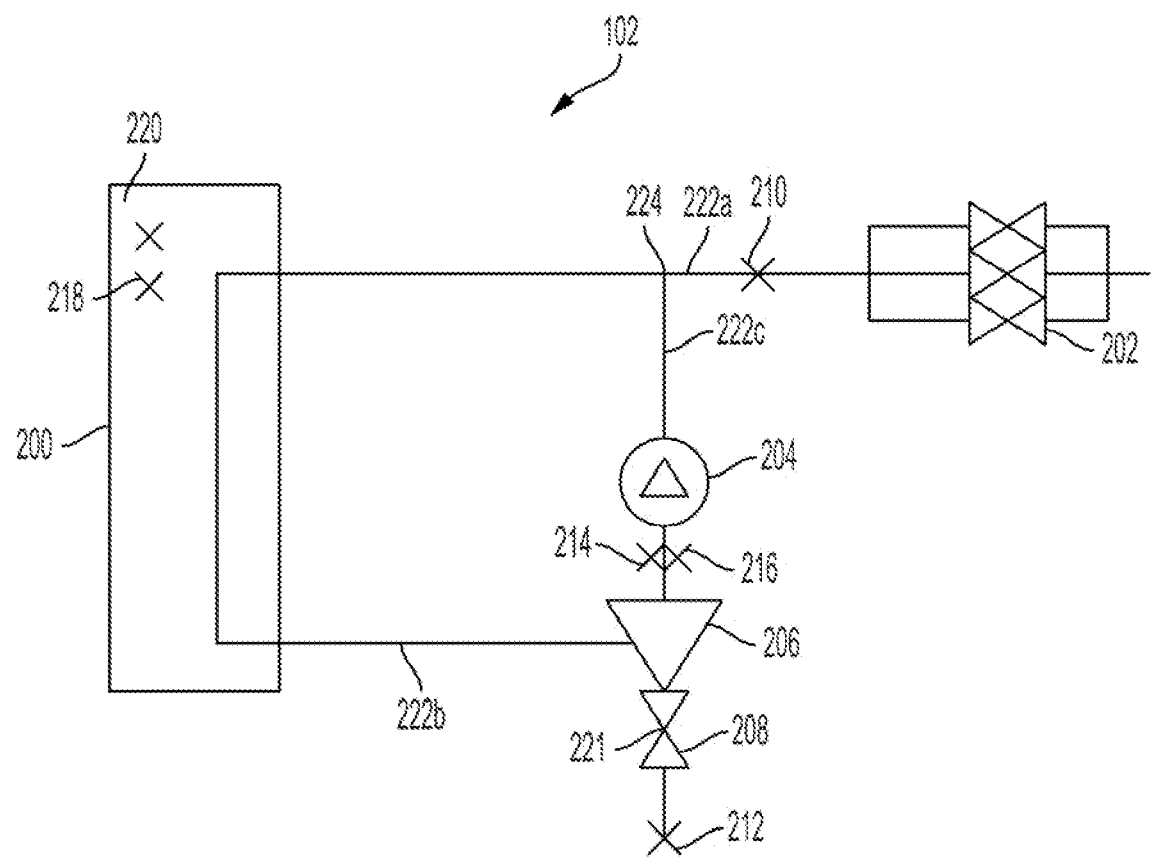
FIG. 2 is a block diagram illustrating various features of the fuel cell circuit of FIG. 1 according to an embodiment of the present disclosure.

FIG. 2 is a block diagram illustrating various features of the fuel cell circuit 102 according to an embodiment of the present disclosure. The fuel cell circuit 102 may include a fuel cell stack 200 having a plurality of fuel cells, one or more injectors 202, a hydrogen pump 204, a liquid vapor separator 206, a shut valve 208, and one or more sensors.

The one or more sensors may include a pressure sensor 210 that measures the pressure of the gas at an outlet of the injectors 202. A pressure sensor 212 may measure the ambient pressure at an outlet of the shut valve 208. A speed sensor 214 may measure the speed of the hydrogen pump 204, and a power sensor 216 may measure the power of the hydrogen pump 204. A current sensor 218 may measure the current flowing through the fuel cell stack 200 and a temperature sensor 220 may measure a coolant temperature of the fuel cell stack 200. A shut valve gate sensor 221 may detect whether the shut valve 208 is open (i.e., purging fluids) or closed (i.e., not purging fluids). The aforementioned components of the fuel cell circuit 102 may be interconnected with one or more pipes 222.

The fuel cell stack 200 converts chemical energy from a fuel (i.e., hydrogen gas) into electricity through an electrochemical reaction of hydrogen gas with oxygen or another oxidizing agent. The fuel cells of the fuel cell stack 200 require a continuous source of fuel and oxygen to sustain the chemical reaction to produce electricity continuously for as long as fuel and oxygen are supplied. Additionally, some fuel may permeate out of the fuel cell stack 200 without reacting. When the vehicle 100 (see FIG. 1) is turned on or when the vehicle 100 accelerates, the vehicle 100 demands more electricity from the fuel cell stack 200. Hence, more hydrogen gas is needed to fuel the fuel cell stack 200 to meet this demand while preventing hydrogen starvation.

The one or more injectors 202, the hydrogen pump 204, and the shut valve 208 may be actuators. As actuators, these components may be controlled by the ECU 106 to meet system target states. The actuators may then control stoic, pressure, and fluid values at various locations of the fuel cell circuit 102 (see FIG. 1) by actuation. The injectors 202 may inject hydrogen gas into the fuel cell circuit 102. The hydrogen pump 204 may be a pump, a compressor, or other blower that moves the hydrogen gas through the fuel cell circuit 102. The shut valve 208 may work in conjunction with the liquid vapor separator 206. The liquid vapor separator 206 separates a vapor-liquid mixture, such as water from gas, or liquid water from water vapor, which flows through the fuel cell circuit 102. Then, the shut valve 208 purges the excess water and gas to regulate a total system pressure out of the fuel cell circuit 102.

The injectors 202 may be natural-gas injectors with solenoid valve control or other open and close device. The ECU 106 may position the injectors 202 to control the flow of gas into one or more components of the fuel cell circuit 102 (see also FIG. 1). The ECU 106 may open, partially open, close, and/or otherwise position the injectors 202 to control the quantity or amount of hydrogen gas injected by the injectors 202. The injectors 202 inject the hydrogen gas to meet a hydrogen gas pressure target at the outlet of the fuel cell stack 200. The injectors 202 have to meet a flow rate target the achieve the hydrogen gas pressure target.

The hydrogen pump 204 recirculates the hydrogen gas back to the fuel cell stack 200 to meet the target hydrogen gas stoic of approximately $(1+\alpha):1$, where $0<\alpha<1.5$. $\alpha$ is a compensatory hydrogen gas stoic. Preferably, a may be 0.25 to yield a target hydrogen gas stoic of 1.25:1. To account for other variables (e.g., transient conditions), the ECU 106 (see FIG. 1) may use the hydrogen pump 204 to pump enough hydrogen gas to provide the compensatory hydrogen gas stoic (i.e., recirculation hydrogen gas stoic) and meet the target hydrogen gas stoic. By increasing the speed of the hydrogen pump 204, the total volumetric flow rate at the inlet of the fuel cell stack 200 is increased, and more hydrogen gas is pumped or recirculated into the fuel cell stack 200 to increase the hydrogen gas stoic. The hydrogen pump 204 may meet the recirculation hydrogen gas stoic based on the hydrogen gas mole fraction at the liquid vapor separator 206 outlet. The hydrogen gas mole fraction at the liquid vapor separator 206 may be estimated by the ECU 106. In some embodiments, the hydrogen gas mole fraction may be obtained through sensor data. The ECU 106 may set a speed for the pump 204 that can maintain a minimum hydrogen gas mole fraction that can meet the recirculation hydrogen gas stoic.

The shut valve 208 exhausts or releases water accumulated within the liquid vapor separator 206 and gases in the fuel cell circuit 102 (see FIG. 1) to regulate the total system pressure. Specifically, the shut valve 208 controls the non-hydrogen gas pressure at the outlet of the fuel cell stack 200. The ECU 106 (see FIG. 1) may position the shut valve 208 into an open, a close, and/or a partially open position to release an amount or quantity of water that has accumulated within the liquid vapor separator 206. Further, the ECU 106 may control the shut valve 208 to exhaust or release the water and/or other non-hydrogen gas to control the amount of non-hydrogen gas at the outlet of the fuel cell stack 200. The shut valve 208 may have to exhaust the water prior to purging the gases. Purging the gases regulates the total system pressure so that it does not exceed a maximum total system pressure. Otherwise, exceeding the total maximum pressure may cause components of the fuel cell circuit 102 to burst and/or malfunction. Purging assists the fuel cell circuit 102 in maintaining a stoic of approximately $(1+\alpha)$ moles of hydrogen gas where $0<\alpha<1.5$ for every 1 mole of hydrogen gas consumed by the fuel cell stack.

The shut valve 208 may operate while maintaining a hydrogen gas mole fraction at the liquid vapor separator 206 outlet that is sufficient to meet a recirculation hydrogen gas stoic target under both steady state and transient conditions. The shut valve 208 may minimize unnecessary hydrogen gas purging in order to preserve the hydrogen gas supply of the fuel cell circuit 102. Hence, the shut valve 208 may only purge gases when it is necessary to not exceed the maximum total system pressure.

The one or more pipes 222 interconnect to form one or more pipe junctions 224 and connect the components of the fuel cell circuit 102. A single pipe 222 may branch off into multiple pipes 222 or multiple pipes 222 may unite to form a single pipe 222. The pipes 222 that split or branch off from the original pipe 222 may run in parallel and may have the same pressure drop across parallel running pipes 222. The one or more pipes 222 allow the gas to flow through the fuel cell circuit 102. For example, the injectors 202 may be connected to and inject the gas to the fuel cell stack 200 through the pipe 222a and the pipe junction 224. In the fuel cell stack 200, the hydrogen gas reacts with the oxygen to generate electricity. The fuel cell stack 200 exhausts and/or emits a gas stream including water and/or water vapor as a by-product of the chemical reaction to generate electricity. The gas stream then passes through the pipe 222b to the liquid vapor separator 206. The liquid vapor separator 206 separates the water and/or water vapor from the gas stream, and the shut valve 208 purges the water and/or water vapor. The hydrogen pump 204 recirculates the gas stream including any remaining hydrogen gas through the pipe 222c and the pipe junction 224 to the fuel cell stack 200.

The ECU 106 may estimate, predict, or model parameters, such as pressure, flow rate, mole fraction, or temperature at various locations of the fuel cell circuit 102, including the injectors 202, the hydrogen pump 204, the shut valve 208, the one or more pipes 222, the liquid vapor separator 206, and the one or more pipe junctions 224 (see also FIG. 1). The ECU 106 may control the speed of the hydrogen pump 204, the number of hydrogen gas injections and the pressure of hydrogen gas supplied by the injectors 202, and open and close the shut valve 208 to maintain the hydrogen stoic.

Figure 3:
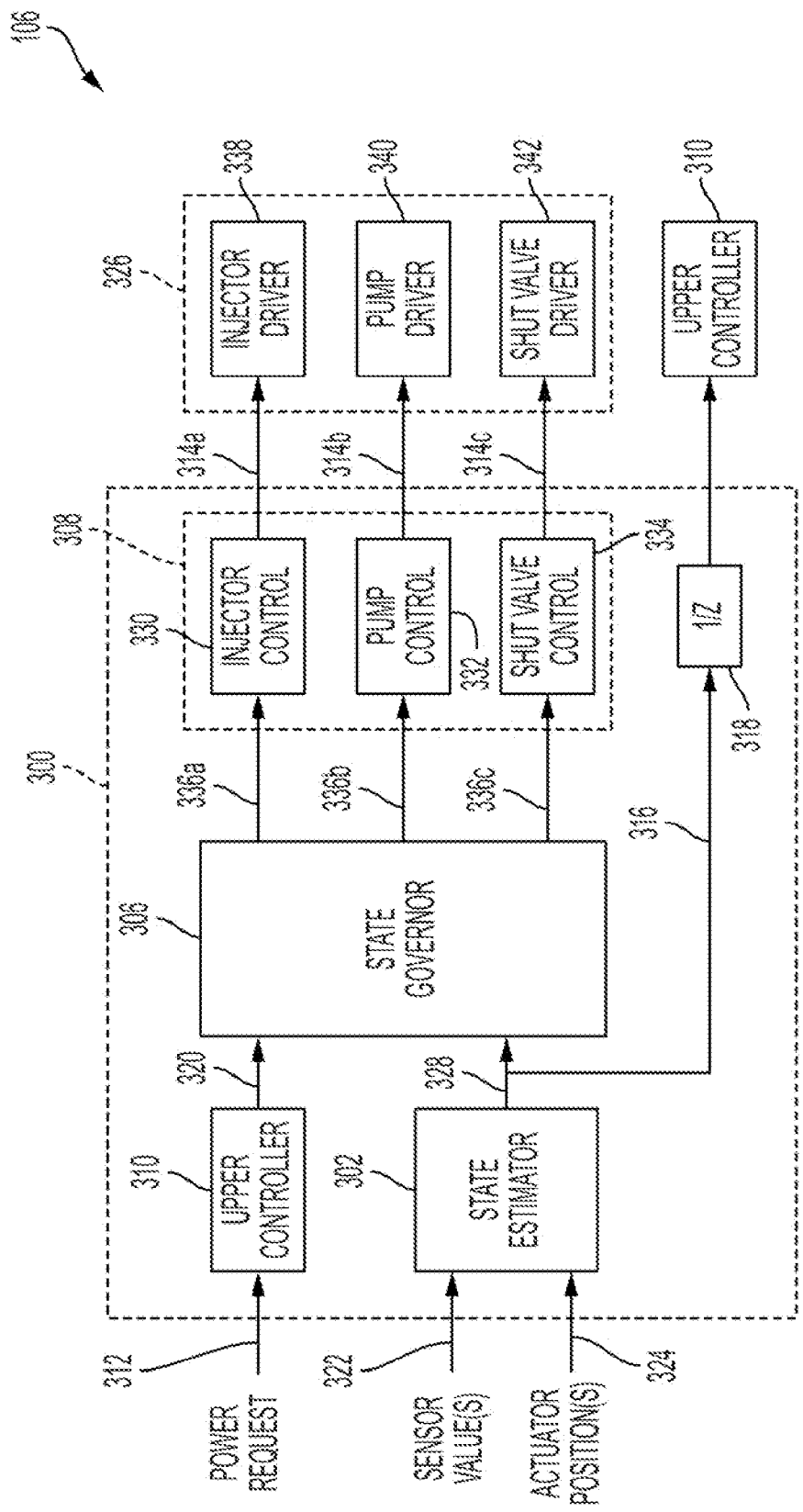
FIG. 3 is a block diagram illustrating various logic components of an electronic control unit (ECU) of the vehicle of FIG. 1 that control actuators of the fuel cell circuit to meet fuel cell hydrogen demand according to an embodiment of the present disclosure.

FIG. 3 is a block diagram illustrating various logic components of the ECU 106 of the vehicle 100 that control actuators of the fuel cell circuit 102 to meet fuel cell hydrogen demand according to an embodiment of the present disclosure (see also FIG. 1). The actuator controller 300 may include a state estimator 302, a state governor 306, a feedforward/feedback control 308, and an upper controller 310. The actuator controller 300 may receive an input, such as a power request 312, and may generate an output, such as actuator commands 314a-c.

The upper controller 310 may receive the power request 312. The upper controller 310 may then identify a target hydrogen gas stoic at the inlet of the fuel cell stack 200 (see FIG. 2), a target hydrogen gas pressure at the outlet of the fuel cell stack 200, and a target minimum volumetric flow rate at the inlet of the fuel cell stack 200. The upper controller 310 may identify these target values based on calibration achieved by conducting bench tests with the fuel cell circuit 102 (see FIG. 2). The target values may depend on the current generated by the fuel cell stack 200. The upper controller 310 may adjust the target values based on information 316 from the state estimator 302. A time signal outputted from the state estimator 302 may be sent back to the upper controller for control purposes by means of a "unit delay" or other time delay logic, visible in block 318. The upper controller 310 may transmit the target values to the state governor 306 as shown by an arrow 320.

The state estimator 302 may receive inputs including sensor values 322 and current actuator positions 324 (or commanded actuator positions) and may estimate conditions at various locations of the fuel cell circuit 102 (see FIG. 2). The sensor values 322 may be obtained from the sensors 210, 212, 214, 216, 218, 220, and 221 (see also FIG. 2). The sensor values 322 may include hydrogen gas pressure at the outlet of the injectors 202, the ambient pressure at the outlet of the shut valve 208, the speed of the hydrogen pump 204, the power of the hydrogen pump 204, the current flowing through the fuel cell stack 200, the coolant temperature of the fuel cell stack 200, and the position of the shut valve 208 (see also FIG. 2). The fuel cell circuit 102 may include relatively few sensors. Additional data is desirable to provide optimal control of the actuators 326. In that regard, the state estimator 302 may calculate, predict, or estimate the additional data (i.e., current conditions) based on the sensor values 322 and the actuator positions 324. For example, the state estimator 302 may estimate hydrogen gas and non-hydrogen gas pressures at various locations of the fuel cell circuit 102. Specifically, the state estimator 302 may estimate pressures of hydrogen gas, nitrogen gas, and water vapor. As another example, the state estimator 302 may estimate a mole fraction of a gas at various locations of the fuel cell circuit 102. Specifically, the state estimator 302 may predict the mole fraction of hydrogen gas at the outlet of the liquid vapor separator 206 (see FIG. 2). The state estimator 302 may output state estimates 328 to the state governor 306. In some embodiments, addition of more sensors that can detect the additional data may be utilized in lieu of the state estimator 302.

The estimates 328 of the state estimator 302 may have an accuracy tolerance. The accuracy tolerance may have to be taken into account within the state governor 306 to prevent hydrogen gas starvation in the fuel cell circuit 102 (see FIG. 2). Estimates based on a sensor measurement may have a low error potential while estimates that do not have an anchoring sensor measurement may have a high error potential. Error protection margins may be applied to controls relying on high error potential estimates in feed forward control 308. For example, a non-hydrogen gas pressure at the outlet of the fuel cell stack 200 (see FIG. 2) may have an error protection margin that may be applied to pump control 332 and shut valve control 334. As another example, an estimated amount of liquid water within the liquid vapor separator 206 (see FIG. 2) may have an error protection margin that may be applied to the shut valve control 334.

The state governor 306 may receive the estimates 328 from the state estimator 302. The state governor 306 may also receive the target values from the upper controller 310. Based on the estimates 328, the state governor 306 may convert the target values into actuator values 336a-c, or commands. The actuator values 336a-c may then be transmitted to the feedforward/feedback control 308. The actuator values 336a-c may be based on meeting the target recirculation hydrogen gas stoic under both steady state and transient conditions by controlling a mole fraction of hydrogen gas at the outlet of the liquid vapor separator 206 (i.e., inlet of the pump 204) (see FIG. 2). The actuator values 336a transmitted to the injector control 330 may include a final hydrogen gas pressure target at the outlet of the fuel cell stack 200 and a flow rate target at the injectors 202 to achieve the final hydrogen gas pressure target at the fuel cell stack 200 (see also FIG. 2). The actuator values 336b transmitted to the pump control 332 may include a target recirculation hydrogen gas flow rate stoic. The actuator values 336c transmitted to the shut valve control 334 may include a non-hydrogen gas pressure maximum threshold at the outlet of the fuel cell stack 200 and a liquid water maximum threshold of the liquid vapor separator 206.

The feedforward portion of the feedforward/feedback control 308 may transmit actuator commands 314a-c to the actuators 326 to achieve the target values based on the actuator values 336c. The feedforward control may advantageously achieve a fast response time from the actuators 326. The feedback portion of the feedforward/feedback control 308 may work to close any existing gap between one or more of the actual state values and one or more of the corresponding target values by increasing the actuator commands 314a-c until the gap eventually closes. The feedback control may advantageously achieve a stable convergence of the gap. However, the feedback control may function relatively slower than the feedforward control. In some embodiments, only one of the feedforward and the feedback control may be utilized.

The feedforward/feedback control 308 may include the injector control 330, the pump control 332, and the shut valve control 334. The injector control 330 may transmit the actuator command 314a to an injector driver 338 of the actuators 326. The pump control 332 may transmit the actuator command 314b to a pump driver 340 of the actuators 326. The shut valve control 334 may transmit the actuator command 314c to a shut valve driver 342 of the actuators 326.

The pump control 332 may calculate a pump speed target from the volumetric flow target obtained from the state governor 306 and the mole fraction of hydrogen gas at the outlet of the liquid vapor separator 206 obtained from the state estimator 302. The error margin of the state estimator 302 may decrease the mole fraction of hydrogen gas and increase the pump speed target. The pump control 332 may command the pump driver 340 to set the pump speed to the calculated pump speed target by transmitting the actuator command 314b.

The shut valve control 334 may command the shut valve driver 342 to purge liquid water from the liquid vapor separator 206 and purge gas from the fuel cell circuit 102 to reduce non-hydrogen gas pressure, and thereby reduce the total system pressure (see also FIG. 2). The shut valve driver 342 may open and close the shut valve 208 (see FIG. 2) based on the actuator command 314c. If either liquid water purge or gas purge is required for efficient operation of the fuel cell circuit 102 and to avoid system failure, the shut valve control 334 may command the shut valve driver 342 to open the shut valve 208. Otherwise, the shut valve 208 may be kept closed. If an estimated amount of liquid water in the liquid vapor separator 206 by the state estimator 302 exceeds a maximum threshold value calculated by the state governor 306, the shut valve control 334 may command the shut valve driver 342 to open the shut valve 208. If a time determined by a time counter exceeds a shut valve open time target calculated for the liquid water in the liquid vapor separator 206 and the non-hydrogen gas at the outlet of the fuel cell stack 200 (see FIG. 2), the shut valve control 334 may command the shut valve driver 342 to close the shut valve 208. The open time target may be based on a purge target both for the liquid water and the non-hydrogen gas. The purge target for the liquid water may be calculated from the actuator values 336c obtained from the state governor 306 by including the error margin of the state estimator 302. The open time target for the liquid water may then be calculated from the purge target and a liquid water purge capability and liquid water accumulation rate of the shut valve 208 obtained from the state estimator 302. If the open time target to purge the liquid water is projected to take longer than a maximum allowable wait time to begin purging the gas, the amount of liquid water accumulated within the liquid vapor separator 206 must be reduced.

If an estimated non-hydrogen gas pressure at the outlet of the fuel cell stack 200 obtained from the state estimator 302 is equal to or greater than a maximum non-hydrogen gas pressure at the outlet of the fuel cell stack 200 obtained from the state governor 306 with the state estimator 302 error protection applied, the shut valve control 334 may command the shut valve driver 342 to open the shut valve 208 (see also FIG. 2). The shut valve control 334 may command the shut valve driver 342 to close to shut valve 208 to maintain a hydrogen gas concentration below a threshold percentage for a given time period. For example, the hydrogen gas concentration may not exceed four percent (4%) average by volume during any moving three second time interval. In another example, the hydrogen gas concentration may not exceed eight percent (8%) at any time. The timer that determines the open time for non-hydrogen gas purging may not start timing until the liquid water is removed from the liquid vapor separator 206.

The injector control 330 may control the hydrogen gas pressure rate of change and the duty cycle of the injectors 202 (see FIG. 2) by transmitting actuator commands 314a to the injector driver 338. The injectors 202 may be binary state devices that open and close. The injectors 202 may be controlled through latching hysteresis switch between a minimum and a maximum pressure target. The injectors 202 may be controlled more precisely by setting a number and a timing of the injectors 202 to open and close. The number of injections conducted by opening the injectors 202 may regulate the total system pressure rate of change. One, some, or all injectors 202 may be opened or closed simultaneously. The injector control 330 may target a number of pressure states to control the injectors 202. For example, a targeted state may be a pressure rise state where the total system pressure is below a target and must be increased. Another targeted state may be a pressure fall state where the total system pressure is above a target and must be decreased. A minimum and a maximum injector flow rate threshold may ensure that the total system pressure is controlled within the targeted states. The minimum and the maximum injector flow rate thresholds may be a threshold for a number of required injectors to raise pressure and a threshold for a number of required injectors to drop pressure, respectively.

Figure 4:
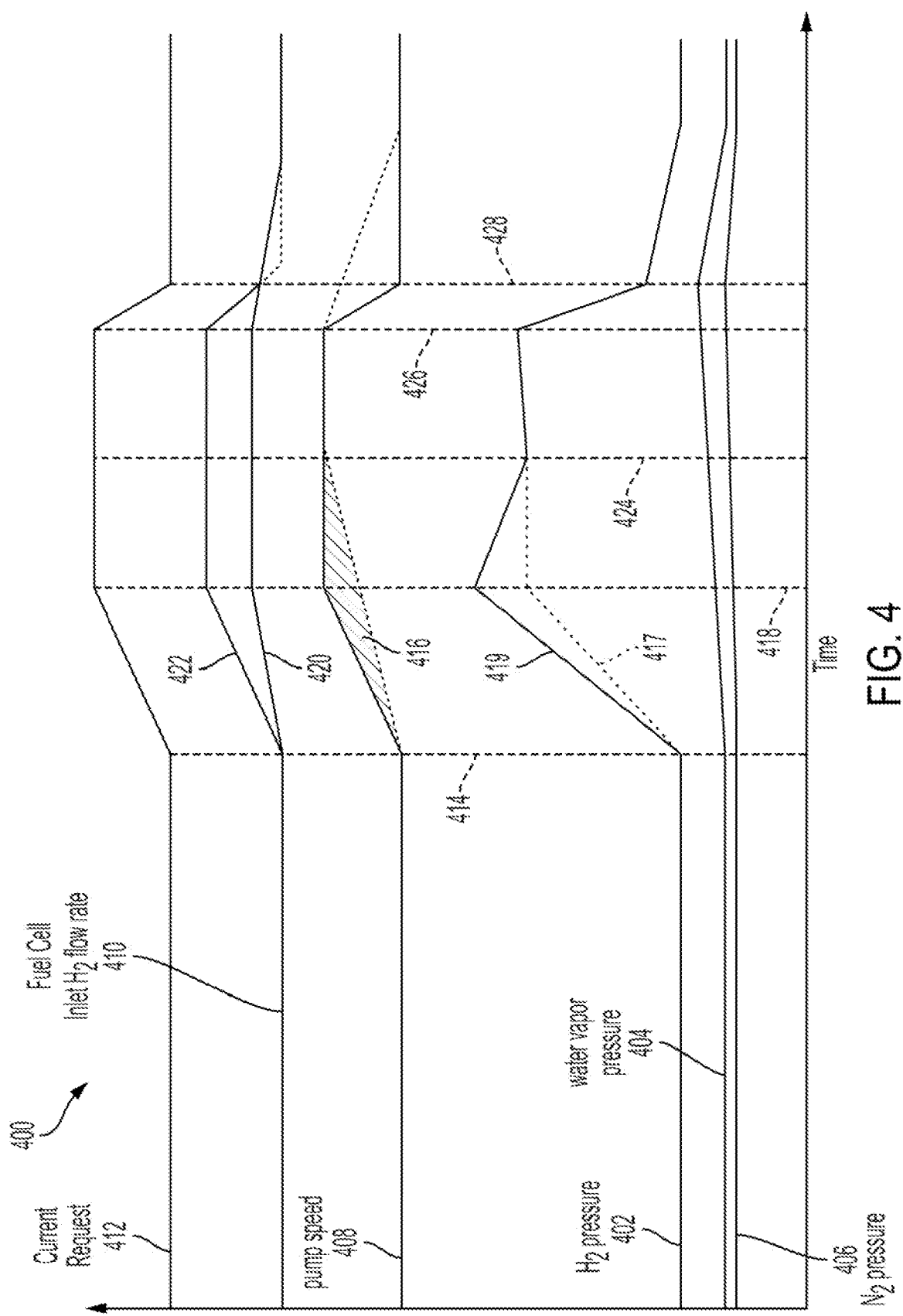
FIG. 4 is a graph illustrating an exemplary operation of the fuel cell circuit of FIG. 1 in a transient condition according to an embodiment of the present disclosure.

FIG. 4 is a graph 400 illustrating an exemplary operation of the fuel cell circuit 102 (see FIG. 2) in a transient condition according to an embodiment of the present disclosure. The graph 400 may be a time plot of pressure values, speed values, flow rate values, and current values. The X-axis illustrates time, and the Y-axis illustrates the following: values of pressure at the outlet of the fuel cell stack 200 (see FIG. 2); specifically, a hydrogen gas pressure illustrated by a line 402, a water vapor pressure illustrated by a line 404, and a nitrogen gas pressure illustrated by a line 406, a pump speed illustrated by a line 408, a flow rate of hydrogen gas at the inlet of the fuel cell stack 200 illustrated by a line 410, and a current request from the fuel cell stack 200 illustrated by a line 412.

As shown, current request, the flow rate, the pump speed, and the pressure values all have target and estimated values that are correct from the beginning of the graph 400 until a first time 414. At the time 414, the target pump speed begins to increase due to the current request beginning to increase, while an estimated pump speed also begins to increase, but at a slower rate. The current request rate may have an increase rate above a predetermined threshold value (e.g., 300 ms). The difference between the target pump speed and the estimated pump speed corresponds to a gap 416. In response, the ECU 106 (see FIG. 3) over increases the hydrogen gas pressure to account for the gap caused by the slow pump speed between times 414, 418. Dashed lines 417 show the hydrogen gas pressure target prior to compensation, and a line 419 shows the compensated hydrogen gas pressure target. By accounting for the gap, the ECU 106 achieves a hydrogen gas recirculation stoic illustrated by a line 420. A line 422 illustrates a total of the hydrogen gas recirculation stoic and a base hydrogen gas stoic from the injectors 202 (see FIG. 2). The hydrogen gas recirculation stoic prevents hydrogen gas starvation of the fuel cell stack 200. Once the desired hydrogen gas recirculation stoic is achieved, the ECU 106 begins to decrease the hydrogen gas pressure at the time 418. The estimated pump speed catches up to the target pump speed at a time 424 and the gap 416 is closed. At the same time, the hydrogen gas pressure stops compensating. At a time 426, the current request begins to drop, which leads to a drop in the stoic and the hydrogen gas pressure. At a time 428, the current request becomes stagnant, which leads to the pump speed to stagnate and the pressure values as well as the stoic to drop further and eventually stagnate.

FIG. 5 is a graph 500 illustrating an exemplary operation of the fuel cell circuit 102 (see FIG. 2) in an over-pressure condition according to an embodiment of the present disclosure. The graph 500 may be a time plot of position values, pressure values, speed values, mole fraction values, and stoic target values. The X-axis illustrates time, and the Y-axis illustrates the following: position of the shut valve 208 (see FIG. 2) illustrated by a line 501, values of pressure at the outlet of the fuel cell stack 200 (see FIG. 2); specifically, a hydrogen gas pressure illustrated by a line 502, a water vapor pressure illustrated by a line 504, and a nitrogen gas pressure illustrated by a line 506, a pump speed illustrated by a line 508, a hydrogen gas mole fraction at the outlet of the liquid vapor separator 206 (see FIG. 2) illustrated by a line 510, and a hydrogen gas recirculation stoic target at the outlet of the fuel cell stack 200 illustrated by a line 512.

At a time 514, the hydrogen gas recirculation stoic target begins to increase to meet hydrogen gas demand and prevent hydrogen starvation of the fuel cell stack 200 (see FIG. 2). At the same time, the pump speed begins to increase to help achieve this higher stoic target. The hydrogen gas partial pressure increases rapidly, and the non-hydrogen gas partial pressures also begin to increase slowly at the time 514. This drives a rapid increase in the H2 mol fraction at the outlet of the liquid vapor separator 206 (see FIG. 2). The shut valve 208 (see FIG. 2) opens to purge water only from the liquid vapor separator 206 at the time 514. The shut valve 208 opens again to purge water periodically and increase the frequency of the purging of water to prepare for purging gas within a period 516.

At a time 518, the hydrogen gas recirculation stoic target reaches a peak value and stabilizes. The hydrogen gas partial pressure target has been achieved and remains flat. The estimated hydrogen gas mole fraction at the outlet of the liquid vapor separator 206 (see FIG. 2) begins to decrease with some time delay as the partial pressure of other non-hydrogen gasses continue to rise. At the same time, the pump speed continues to increase at a slower rate to maintain the stoic target and compensate for the decreasing mole fraction of hydrogen. The shut valve 208 (see FIG. 2) opens to purge water only from the liquid vapor separator 206 at the time 518.

At a time 520, the maximum system combined pressure threshold illustrated by dashed lines 522 is reached with the continued increase of non-hydrogen gas pressures. At the same time, the non-hydrogen gas pressure threshold illustrated by dashed lines 524 is reached with the increase of the non-hydrogen gas pressure. This triggers activation of the shut valve 208 (see FIG. 2) to purge water as well as gas and prevent the combined pressure threshold from being exceeded. By not exceeding the non-hydrogen gas pressure threshold, the minimum mole fraction of hydrogen gas and the hydrogen gas pressure is maintained. At the same time, the mole fraction of the hydrogen gas reaches a minimum mole fraction of the hydrogen gas at the outlet of the liquid vapor separator 206 illustrated by dashed lines 526 for the pump 204 to maintain the hydrogen gas recirculation stoic target (see also FIG. 2). This corresponds to the pump speed hitting its maximum pump speed threshold illustrated by dashed lines 528. The mole fraction of the hydrogen gas, the pump speed, the hydrogen gas pressure, and the non-hydrogen gas pressures are stable between the time 520 and time 530, or during a period 532. The stoic target remains constant during this time. Effectively, this control allows for maintaining a constant H2 stoic value while minimizing gas purging by carefully coordinating the relationship between the total gas pressure, H2 and non-H2 partial pressures, and hydrogen pump speed.

At the time 530, the hydrogen gas recirculation stoic target begins to decrease. At the same time, the pump speed and the hydrogen and non-hydrogen gas pressure begin to decrease, and the mole fraction of the hydrogen gas at the liquid vapor separator 206 (see FIG. 2) begins to increase. At a time 534, the power generation target of the FC has dropped, and the hydrogen gas recirculation stoic target and the mole fraction of the hydrogen gas become stable, and the shut valve 208 purges water only. The non-hydrogen gas pressure continues to drop due to crossover back from the anode to the cathode, as the cathode pressure drops to reflect the reduced FC power generation target.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for controlling flow of fluids in a fuel cell circuit of a vehicle, comprising: a fuel cell stack having a plurality of fuel cells, the fuel cell stack configured to receive hydrogen gas; a current sensor configured to detect a current flowing through the fuel cell stack; a plurality of actuators including: at least one injector configured to supply the hydrogen gas to the fuel cell stack and adjust a pressure of the hydrogen gas; a pump or a blower configured to facilitate the flow of the fluids in the fuel cell circuit, the fluids comprising the hydrogen gas and non-hydrogen gases; a shut valve configured to purge the fluids from the fuel cell circuit to adjust pressures of the non-hydrogen gases; and an electronic control unit (ECU) coupled to the fuel cell stack, the current sensor, and the actuators configured to: estimate the pressure of the hydrogen gas and the pressures of the non-hydrogen gases in real-time, the pressures of the hydrogen gas and the non-hydrogen gases defining a total system pressure; determine a current increase rate based on the detected current; and apply a compensatory hydrogen gas stoic to a base hydrogen gas stoic to meet a target hydrogen gas stoic by controlling one or more of the actuators based on the estimated pressures of the hydrogen gas and the non-hydrogen gases when the fuel cell current increase rate is above a predetermined threshold value.

2. The system of claim 1, wherein the ECU increases the pressure of the hydrogen gas by controlling the at least one injector to meet the target hydrogen gas stoic when the pump operates below an optimal speed under transient conditions.

3. The system of claim 2, wherein the ECU decreases the pressure of the hydrogen gas once the pump operates at the optimal speed.

4. The system of claim 1, wherein the ECU controls the shut valve to regulate the total system pressure to ensure that the total system pressure does not exceed a maximum total system pressure.

5. The system of claim 1, wherein the non-hydrogen gases comprise water vapor, and further comprising a liquid vapor separator configured to direct the water vapor from the fuel cell stack to the pump and direct liquid water separated from the water vapor to be expelled through the shut valve to meet the target hydrogen gas stoic.

6. The system of claim 5, wherein the ECU estimates a mole fraction of the hydrogen gas at an outlet of the liquid vapor separator to determine a speed of the pump.

7. The system of claim 1, wherein the ECU increases a speed of the pump to meet the target hydrogen gas stoic.

8. The system of claim 1, wherein the compensatory hydrogen gas stoic is 0.25, the base hydrogen gas stoic is 1.00, and the target hydrogen gas stoic is 1.25.

9. The system of claim 1, wherein the ECU may open at least one of the at least one injector to control the pressure of the hydrogen gas.

10. A method for meeting hydrogen gas demand in a fuel cell circuit of a vehicle under transient conditions, the method comprising:
    detecting, by a current sensor, a current flowing through a fuel cell stack;
    estimating, by an electronic control unit (ECU), a pressure of the hydrogen gas and pressures of non-hydrogen gases at an outlet of the fuel cell stack;
    determining, by the ECU, a current increase rate based on the detected current;
    determining, by the ECU, a target hydrogen gas stoic at an inlet of the fuel cell stack based on the detected current; and
    increasing, by at least one injector, the pressure of the hydrogen gas at the outlet based on the estimated pressures of the hydrogen gas and the non-hydrogen gases to meet the target hydrogen gas stoic when the current increase rate is above a predetermined threshold.

11. The method of claim 10, further comprising decreasing, by the ECU, the pressure of the hydrogen gas once a pump configured to recirculate the hydrogen gas into the fuel cell stack operates at a speed to meet the target hydrogen gas stoic when the current increase rate is above the predetermined threshold.

12. The method of claim 10, further comprising purging, by a shut valve, a predetermined amount of the hydrogen gas and predetermined amounts of the non-hydrogen gases from the fuel cell circuit to keep a total system pressure defined by the pressures of the hydrogen gas and the non-hydrogen gases at or below a maximum total system pressure.

13. The method of claim 12, wherein the non-hydrogen gases comprise water vapor, further comprising separating, by a liquid vapor separator, liquid water from the water vapor and exhausting, by the shut valve, the liquid water prior to the purging of the predetermined amount of the hydrogen gas and the predetermined amounts of the non-hydrogen gases.

14. The method of claim 10, wherein the ECU estimates the pressure of the hydrogen gas based on data from one or more pressure sensors configured to detect pressure at least at an outlet of the at least one injector.

15. The method of claim 10, wherein the ECU may open at least one of the at least one injector to control the pressure of the hydrogen gas.

16. A method for meeting hydrogen gas demand in a fuel cell circuit of a vehicle, the method comprising:
    determining, by an electronic control unit (ECU), a target hydrogen gas recirculation stoic at an inlet of a fuel cell stack;
    estimating, by the ECU, a mole fraction of the hydrogen gas at an outlet of a liquid vapor separator, a pressure of the hydrogen gas, and pressures of non-hydrogen gases at an outlet of the fuel cell stack, the pressures of the hydrogen gas and the non-hydrogen gases defining a total system pressure; and
    increasing, by the ECU, a speed of a hydrogen pump based on the mole fraction of the hydrogen gas to meet the target hydrogen gas recirculation stoic while minimizing excess hydrogen gas purging to improve overall efficiency of the fuel cell circuit.

17. The method of claim 16, further comprising purging, by a shut valve, a predetermined amount of the hydrogen gas, predetermined amounts of non-hydrogen gas, and a predetermined amount of liquid water directed from the liquid vapor separator to prevent the total system pressure from exceeding a maximum total system pressure.

18. The method of claim 17, wherein the predetermined amount of the hydrogen gas and the predetermined amount of non-hydrogen gas are purged to maintain the pressure of the hydrogen gas at the outlet of the fuel cell stack at a target pressure and the mole fraction of the hydrogen gas at the outlet of the liquid vapor separator at a minimum mole fraction.

19. The method of claim 16, wherein the ECU determines the target hydrogen gas recirculation stoic based on a current flowing through the fuel cell stack.

20. The method of claim 16, further comprising determining, by the ECU, a target volumetric flow of the hydrogen gas to determine the speed of the hydrogen pump.

* * * * *